June 14, 1960 P. L. LINDLEY 2,941,190

MAGNETIC SELECTING SYSTEM

Filed Jan. 18, 1956

INVENTOR.
PETER L. LINDLEY
BY Ralph K. Bonell
AGENT

United States Patent Office 2,941,190

Patented June 14, 1960

2,941,190

MAGNETIC SELECTING SYSTEM

Peter L. Lindley, Berwyn, Pa., assignor to Burroughs Corporation, Detroit, Mich., a corporation of Michigan Filed Jan. 18, 1956, Ser. No. 559,902

7 Claims. (Cl. 340—174)

The present invention relates to magnetic storage systems and more particularly to a system having a multiplicity of magnetic heads from which one is to be selected for write-in or read-out operations.

In magnetic storage systems utilizing a plurality of magnetic heads various ways have been heretofore provided to select one of the heads for write-in and read-out operations without setting up disturbances in the non-selected heads. While some such attempts have made head selection more practical each is accompanied by disadvantages such as (*a*) the problem of a required excessive amount of electron-tube equipment; (*b*) the problem of temporary electrical connections in the (low level) read circuit which cause signal attenuation due to imperfect contact closure; (*c*) the problem of standby power consumption; (*d*) the problem of cost; and (*e*) the problem of unreliability of non-established techniques and novel components.

An object of the present invention is to provide a selecting system for a plurality of magnetic heads wherein the foregoing disadvantages are overcome.

Another object is to provide a selection system for a plurality of magnetic storage heads wherein associated components are reduced to a minimum while resulting in practical, efficient operation of a single selected magnetic head free of disturbances from non-selected heads.

Another object is to provide an improved magnetic head system including a plurality of write and read windings wherein any one of the write windings can be selected for a write operation while the remaining write windings remain unconnected to a write signal.

A further object is to provide a magnetic head system including a plurality of write and read windings wherein all of the read windings are included in a closed circuit to eliminate thereby the opening and closing of contacts in the read circuit.

A further object is to provide an improved magnetic head system wherein the write winding of each head is included in a divided circuit having separate contact closing means in each branch.

A further object is to provide a magnetic head selecting system including a plurality of heads, each having a control winding transformer-coupled to a read winding, wherein all control windings, except the one selected, are short circuited, whereby a flux change in the head generates a voltage in the read winding of only the head in which the control winding has been selected.

Figures 1, 2, 3, 4:
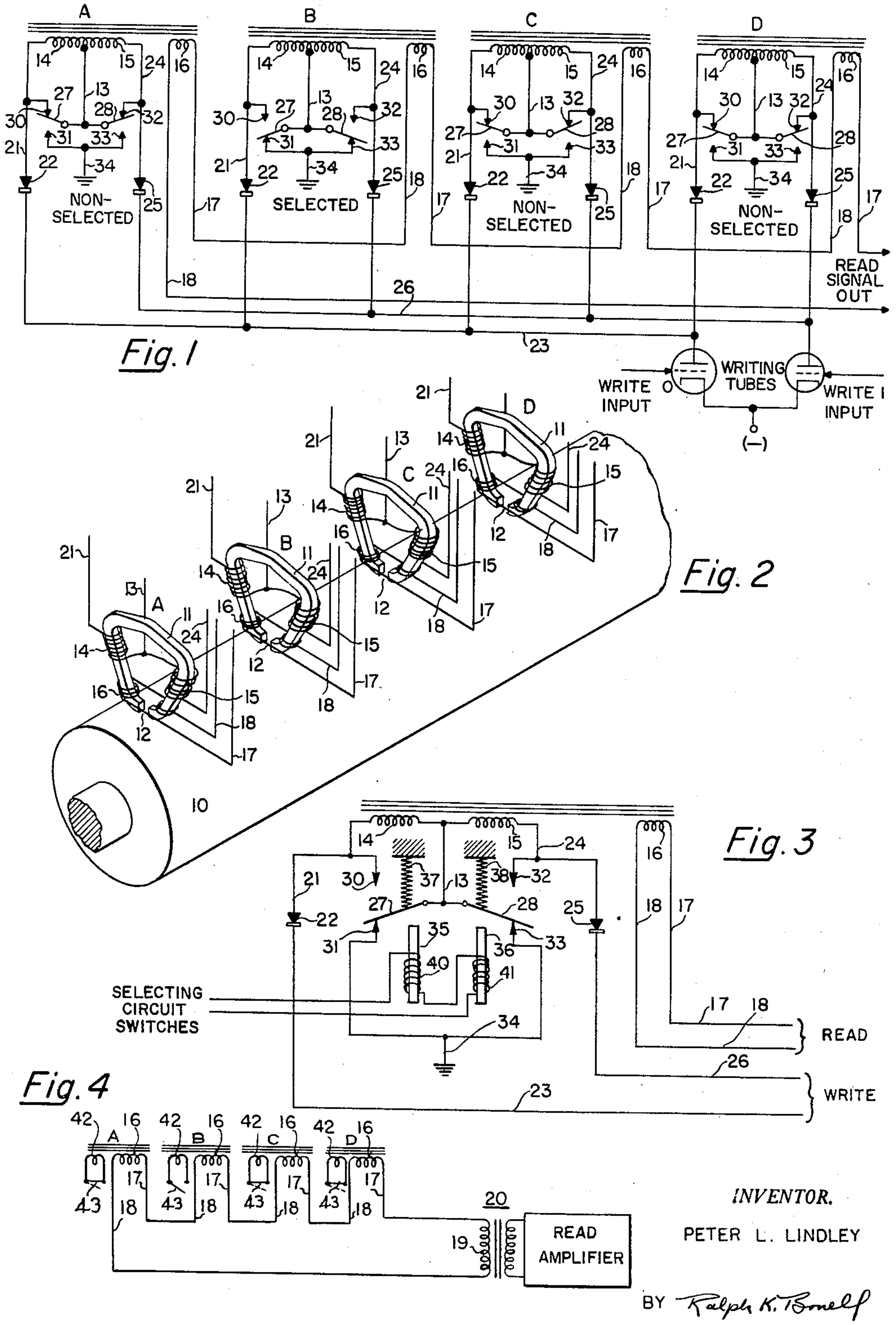
Fig. 1 is a circuit diagram of one form of the present invention for writing and reading information on or from a magnetizable drum or tape or the like and illustratively showing a system for four magnetic heads.
Fig. 2 is a perspective view of the magnetic heads as associated with a magnetizable drum.
Fig. 3 is a detail circuit as representative of any one of a series of heads as set for a read or a write operation.
Fig. 4 is a detail of a modified circuitry for read operation only.

Referring to the drawings one form of the present invention is shown illustratively associated with a magnetic drum 10 arranged to write and read through the medium of a plurality of magnetizable surfaced heads (four being shown) A, B, C and D, respectively consisting of a plurality of electromagnets. It is to be understood any magnetizable medium can be used in place of a drum. Each head consists of a bifurcated core 11 made from material suitable for carrying a magnetic flux and providing a closed magnetic path except for the gap 12, a write winding for producing such flux, and a transformer-coupled read winding. The write winding is center-tapped by lead 13, so that it is effectively two coils 14 and 15 on the core 11. The read winding 16 is also about the core 11 and has leads 17 and 18 in series relation. Leads 17 and 18 include the primary coil 19 of a transformer 20 for delivering voltage to a read amplifier circuit. The several read windings 16 are arranged in series relation forming with the primary coil 19 a closed circuit for the entire system, as distinguished from the common type of individual closed read circuits or systems of read circuits depending upon contact operation.

For write purposes one end of each winding 14 has a lead 21 by way of a blocking diode 22 to a conductor 23 (common to all of the heads) leading to the output of a write tube schematically indicated. Also one end of each winding 15 has a lead 24 by way of a blocking diode 25 to a conductor 26 (common to all of the heads) leading to the output of a second write tube schematically indicated. The circuit for selective operation of the heads is arranged to be controlled in this instance by a double-pole double-throw relay of which the pivoted contactors 27 and 28 are connected to the center tapped lead 13. The contactor 27 is arranged to swing between fixed contacts 30 and 31 and the contactor 28 is arranged to swing between fixed contacts 32 and 33, both of the contactors 27 and 28 shift in synchronism as will be understood. The contact 30 is connected to the lead 21 and the contact 32 is connected to the lead 24. The two contacts 31 and 33 have a common lead 34 to ground for circuit closing.

In order to select a head for write purpose two solenoids 35 and 36 are respectively operatively positioned on the contact make side of the contactors 27 and 28, while two tension coil springs 37 and 38 are respectively connected to the contactors 27 and 28 as a biasing means to shift the relay when the solenoids are deenergized. The solenoids 35 and 36 have mutually operable coils 40 and 41 in series relation with selecting circuit switches as is well known. In Fig. 1 the magnetic heads A, C and D are shown with the respective relays in deenergized condition so that each pair of contactors bridge its contacts 30 and 32 and consequently short circuit the write winding coils 14 and 15. However the head B is shown as selected and consequently the relay has been actuated so as to bridge the contacts 31 and 33 and thus close the circuit for writing by either coil 14 or 15 according to which write circuit is transmitting a pulse.

For a writing operation it has been assumed that the relay for the head B has been operated by an incoming signal so that the contactors 27 and 28 have been shifted by the energizing of the solenoids 35 and 36, to close the contacts 31 and 33, and the head B is thus selected for a writing operation while in the remaining heads the respective relays are held bridging contacts 30 and 32 to maintain the short circuitry relation. The appropriate tube, for writing either binary information "0" or "1," is pulsed and in this instance it is assumed that the "0" tube has been pulsed. The writing tube cathodes are at a negative voltage so that plate current is drawn from ground through the closed relay, conductor 13, coil 14, conductor 21, diode 22 and conductor 23, to "0" tube to energize the head "B" for writing. None of the heads A, C or D are responsive to this transmitted pulse because, with switch contacts 27 of the non-selected heads each in its upper position, there is no closed circuit path for the writing current through any of the non-selected heads. Also, diodes 22 of the non-selected heads block any circulating current.

For a read operation for this head B selection, the write windings 14 and 15 of the heads A, C and D are short-circuited by the respective deenergized solenoids 35 and 36, and consequently represent a very low impedance which make it impossible for a reading voltage to be built up in the corresponding read windings 16 during a flux change in these heads which would otherwise induce a reading voltage. Such a reading voltage is, however, induced in selected head B's read winding 16. The signal read voltage, being the sum of these signals from all heads in the system, remains then the signal read by the selected head B.

A modified form of the invention is shown in Fig. 4 wherein each head has a single control winding 42 and a read winding 16 thereon in transformer coupled relation, the several readings 16 being in a closed series circuit, the same as shown in Fig. 1 and identified by like reference numerals. Each such control winding 42 is in a circuit including switch 43 arranged to be operated either manually or by such a mechanism as shown in Fig. 3. Normally all of the control windings 42 are respectively short circuited by the closed switches or relays so that any one head can be selected by breaking the short circuit of its control winding 42 and thereby permitting the associated read winding 16 of that winding to operate in response to a flux change in the magnetizable medium of the selected head. In Fig. 4 the head B is selected and the control winding switch has been opened. Thus the circuitry of Fig. 4 is specifically for reading only by a selected head, while the non-selected heads remain ineffective.

It will now be apparent that a complete unitary magnetic head selecting system has been devised wherein a plurality of magnetic heads are provided for selective operation, each such head including two write windings and a read winding in transformer coupled relation with all of the read windings being permanently connected in a closed circuit optionally including an output transformer to a read circuit. The two write windings of each head are arranged for selective operation by a pulse from a selected write tube of a processing circuit in association with means short circuiting the write windings of the non-selected heads whereby only the signal from the read winding of the selected head is transmitted.

Furthermore by employing a double-pole double throw relay it will be seen that the two coils of each write winding are arranged to be short circuited by a circuit including two switch contacts. Also when one coil of a write winding is selected for energization it is included in a ground circuit having two switch contacts. Thus in the short circuited position of the switch the hazard of an imperfect contact is minimized by this duplication. In other words both circuits are protected by a supplemental contact whereby each circuit has two paths leading to a common end.

In the modified form of the invention shown in Fig. 4 the novel circuitry provides for read operation only and for that purpose each head is formed by a single control winding being selectively controlled so that the one of a selected head renders its read winding responsive to a change of flux in the magnetizable medium, while the read windings of the non-selected head are ineffective for a read operation. In this form also all read windings are in a closed circuit.

A co-pending application, Serial No. 315,892, filed October 15, 1952, now Patent No. 2,932,008, by George G. Hoberg and entitled "Matrix System," which is assigned to the assignee of the present application, discloses and claims a matrix of magnetic core elements, individual ones of which may be selected by means of a split-winding thereon and associated selection circuitry.

What is claimed is:

1. A magnetic head selecting system, comprising a plurality of magnetic heads, a magnetizable medium operatively arranged with respect to said heads, each head being formed by a core, a tapped write winding and a read winding, said windings being transformer coupled by said core, an information processing circuit including a selected one of said write windings, double-pole double-throw contact selection means for each write winding serving to couple a selected head into said circuit, said contact means connecting the tap with each end of said write winding in one position, said contact means being further connected to couple said tap to a connection in said processing circuit in another position, and unilaterally conductive means in each end lead of said write windings to prevent current passage to the write windings of the non-selected heads when the selected write winding is energized, and a circuit coupling all the read windings in series, whereby shorted write windings prevent signals in all the read windings except that of the selected head.

2. A magnetic selecting system comprising a plurality of magnetic elements, a magnetizable medium operatively arranged to store information with said elements, each element being formed by a core, a control winding and a read winding, said windings being on said core, means respectively short circuiting said control windings, element selecting means to open the circuit of the selected control winding whereby a voltage is generated only in the read winding of the selected element in response to a flux change in said magnetizable medium.

3. A magnetic head selection system comprising, in combination, a plurality of magnetic heads operatively associated with a magnetic recording medium, each of said heads being formed by a magnetic core having two write windings and a read winding inductively coupled thereto, each of said write windings being connected to a separate write circuit for selective operation from a processing circuit common to all write circuits, a dual contact selection means for shorting the write windings of all except that of a selected one of said heads and for connecting such selected write winding to its write circuit, and means for electrically connecting the read windings of the magnetic heads in a closed series circuit, the shorted write windings serving to prevent effective signals in all of the read windings except that of the selected head.

4. A magnetic head selecting system comprising, in combination, a plurality of magnetic heads adapted to be operatively associated with a movable magnetizable medium, each head being formed by a magnetic core having a substantially center tapped write winding and a read winding inductively coupled thereto, an information processing circuit for the write windings of the cores providing two common leads connectible to separate sources of writing pulses, a write circuit associated with each write winding and connecting the opposite ends thereof to a different one of said common leads, means for connecting the tap of each write winding to a source of electrical potential differing from said pulse sources, switch means associated with each magnetic head and movable to two positions, in one position the switch means connecting the center tap of its associated write winding with said source of different electrical potential and in the other position the switch means connecting the center tap with the opposite ends of the write winding so that the latter is effectively shorted, means normally urging each switch means to move said other position of its movement, and control means responsive to electrical signals external to the system for moving each switch means to its said one position of movement whereby a selected one of the magnetic heads may have its switch means moved to the said one position so that write winding thereof may be energized from one of said pulse sources to write on the magnetizable medium while the switch means of the non-selected heads have their respective switch means in their other positions of movement, means operatively associated with each of said write circuits for inhibiting current passage to the write windings of the non-selected heads from said pulse sources, and means connecting said plurality of read windings, one associated with each head, in series, the arrangement being such that when said plurality of heads are subjected to a change in flux from said movable magnetizable medium a voltage is induced only in the read winding of the selected head, the short circuited write windings of the non-selected heads functioning to prevent appreciable flux change in the cores of such non-selected magnetic heads.

5. A magnetic head selecting system comprising, in combination, a plurality of magnetic heads operatively associated and having relative motion with respect to a magnetizable record medium for reading information therefrom, each of said heads comprising a magnetic core having a control winding and a read winding inductively coupled thereto; individual switch means operatively associated with each control winding for normally effectively short circuiting the associated control winding; selecting means separately connecting each of said individual switch means to a source of control signals external to the system for opening the short circuit of the control winding of a selected head; and a common read circuit coupling the read windings of the plurality of magnetic heads in series, the arrangement being such that a read voltage is generated in only the read winding of said selected head in response to the magnetic flux derived from the magnetizable medium, the shorted control windings of the non-selected heads of the system preventing generation of significant voltages in the read windings of such non-selected heads.

6. In combination, a plurality of magnetic transducers each comprising a core of magnetizable material having a read winding and at least one additional winding coupled thereto; means connecting said read windings in series in a common circuit; individual means for normally shorting the said additional winding of each transducer; and selective means for opening the short circuited additional winding of one selected transducer, whereby in response to a change in flux field in the vicinity of said magnetic transducers a voltage is induced in the read winding of only said selected transducer, said shorted additional winding of the non-selected transducers being effective to prevent appreciable change in flux in the core associated therewith.

7. In combination; a magnetizable record medium; a plurality of magnetic transducers magnetically coupled to said medium, each transducer comprising a core of magnetizable material having a read winding and a write winding coupled thereto; means connecting said read windings in series in a common circuit; individual switch means normally shorting the write winding of each transducer; selective control means for opening the short circuited write winding of one selected transducer; current means for driving write current selectively in one direction or the other through the write winding of the selected transducer to record a "1" or a "0" on said record medium; and read means responsive to current flow through said common read circuit in response to a voltage induced in a read winding, the arrangement being such that in response to the flux field of said record medium in the vicinity of said magnetic transducers a voltage is induced in the read winding of only the selected transducer, said shorted write windings of the non-selected transducers being effective to prevent appreciable change in flux in the cores associated therewith.

References Cited in the file of this patent

UNITED STATES PATENTS

| | | |
|---|---|---|
| 2,611,025 | Jankowski | Sept. 16, 1952 |
| 2,670,212 | Heller et al. | Feb. 23, 1954 |
| 2,719,773 | Karnaugh | Oct. 4, 1955 |

FOREIGN PATENTS

| | | |
|---|---|---|
| 158,890 | Australia | May 18, 1953 |